United States Patent Office 3,377,177
Patented Apr. 9, 1968

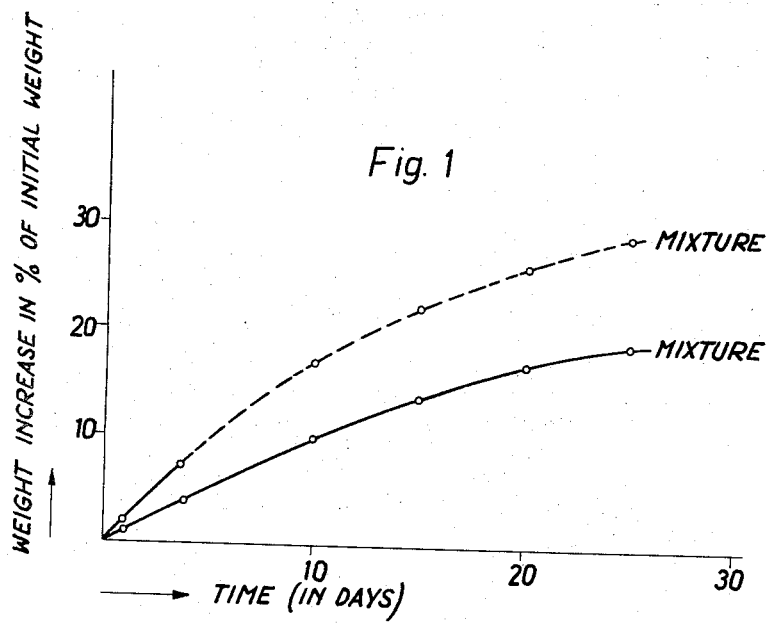
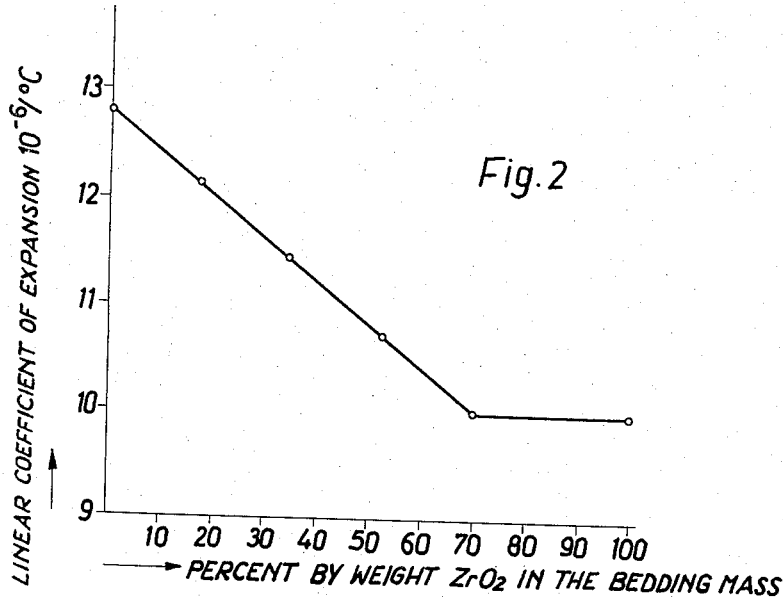

3,377,177
METALLURGICAL FURNACE LINING
Wilhelm Anton Fischer, Ratingen, Germany, assignor to Max-Planck-Institut fur Eisenforschung, Dusseldorf, Germany
Continuation of application Ser. No. 464,151, June 15, 1965. This application Dec. 29, 1966, Ser. No. 605,945
Claims priority, application Germany, July 17, 1964, M 61,765
6 Claims. (Cl. 106—57)

ABSTRACT OF THE DISCLOSURE

A composition adapted to form a lining for a metallurgical furnace and a method of making the composition wherein fused lime is comminuted to a mass of particles of grain size 0.25 mm. to 4 mm. and a bedding material is adapted therein in a ratio by weight of 3:7, the bedding material consisting of substantially equimolar quantities of calcium oxide and zirconium oxide with a particle size less than 0.12 mm.

---

This application is a continuation of application Ser. No. 464,151, filed June 15, 1965 (now abandoned).

My prior U.S. patent application Ser. No. 212,595, now Patent No. 3,223,758, relates to a method of preparing metallurgical furnace linings of lime, especially for furnaces for the production or treatment of iron and steel, the method comprising melting a conventionally calcined lime, comminuting the cooled fused lime by crushing, granulating or grinding, and using it as a tamping material or in brick form as a lining. When this material is used, it must be rapidly processed to counteract its tendency to become hydrated if it is stored in air for any length of time. It has also been found that the tendency of the comminuted fused lime to become hydrated and disintegrate is reduced with increasing purity of the melted lime and if it is melted in an electric arc.

Further studies of this problem have now led to the discovery that zirconium oxide processed in a specific way with the fused lime is of very considerable influence, not only on the resistance of the fused lime to hydration, but also on its thermal expansion coefficient, which is $12.9 \times 10^{-6}$ in the case of the compound CaO. Since refractory building materials used as linings for metallurgical furnaces must be resistant not only to hydration but also to considerable temperature changes, it is very important to solve these problems.

According to this invention a metallurgical furnace lining consisting of comminuted fused lime contains a bedding material consisting of a fine fraction of the comminuted fused lime having a grain size of less than 0.25 mm. with finely ground zirconium oxide added to it, the bedding material serving to bind together the more coarsely grained fractions of the comminuted fused lime on sintering the lining.

It has been found that the bedding material, which is based primarily on the compound $CaO \cdot ZrO_2$, on sintering of the lining material results in intimate coalescence of the coarser fractions of the comminuted fused lime. The bedding material is preferably produced beforehand by melting lime and zirconium oxide followed by comminution to the fine grain size of less than 0.25 mm. after which it is mived with the coarser grain fractions of the lining. Instead of preparing the bedding material from fused lime, it can be produced by roasting or melting a mixture of limestone or quicklime with zirconium oxide. Preferably the bedding material consists of lime having a grain size of less than 0.25 mm. and up to 70% of zirconium oxide having a grain size of less than 0.12 mm.

The following details show to what extent the resistance to hydration of the lining material consisting primarily of fused lime is increased by the invention while the coefficient of thermal expansion of the lining is reduced. Mixtures consisting of:

(a)

20% fused lime with 2 to 4 mm. grain size
20% fused lime with 1 to 2 mm. grain size
15% fused lime with 0.5 to 1 mm. grain size
15% fused lime with 0.25 to 0.5 mm. grain size
30% fused lime with a grain size of less than 0.25 mm.

(b)

20% fused lime with 2 to 4 mm. grain size
20% fused lime with 1 to 2 mm. grain size
15% fused lime with 0.5 to 1 mm. grain size
15% fused lime with 0.25 to 0.5 mm. grain size
10% fused lime with a grain size of less than 0.25 mm., and
20% zirconium oxide with a grain size of less than 0.12 mm.

the last two (substantially equimolar) constituents together forming bedding material, were fired for 2 hours at 1600° C. after being molded into bricks, and were exposed to a water-vapor-saturated air atmosphere after cooling at 24° C. while their weight increase was plotted against time. With a weight increase of about 32%, based on the initial weight of fused lime, the lime particles were completely converted to calcium hydroxide. FIG. 1 shows that the addition of the zirconium oxide to the fine-grain fraction of mixture (b) clearly reduced the weight increase as compared with mixture (a), which consisted solely of fused lime. The resistance to hydration has been substantially doubled by an addition of 20% zirconium oxide (this represents about 70% of the bedding material consisting of 10% fused lime and 20% zirconium oxide).

Mixtures as described in the above example were molded into bricks in the same way and sintered at the same temperature. The mean linear coefficient of expansion of these bricks was determined between 20° C. and 1100° C. It was $12.8 \times 10^{-6}/°$ C. in the case of bricks made from mixture (a). The coefficient of expansion of the lining was greatly reduced, as shown in FIG. 2, with increasing zirconium oxide contents of the bedding material consisting of lime having a grain size of less than 0.25 mm. and zirconium oxide having a grain size of less than 0.12 mm. The value reached with composition of mixture (b) was $10 \times 10^{-6}/°$ C. Zirconium oxide additions beyond this are not so effective in practice.

The extent to which the invention enhances the useful properties of fused lime will now be described:

Fused lime mixtures of grain composition (b) were mixed with 1% boric acid as sintering agent and 0.8% Diesel oil and thoroughly mixed in a concrete mixer. The addition of Diesel oil prevents any extensive separation of the mix during the further processing of this material. The resultant mix was tamped into a medium-frequency furnace to produce a refractory crucible lining on which mainly high-alloy steels were melted in operation. Whereas crucibles made in the same way from grain mixtures of composition (a) with a capacity of up to 1 metric ton had an average life of 50–60 melts, the zirconium oxide-containing crucibles had a life of more than 80 melts.

A furnace lining embodying my invention may also be produced by forming mixture (b) into bricks fired at temperatures above 1400° C., e.g. 1700° C.

I claim:

1. A composition adapted to form a lining for metallurgical furnaces, said composition consisting of (a) comminuted fused lime with coarser grain sizes ranging from substantially 0.25 mm. to 4 mm. and, admixed therewith, (b) a comminuted bedding material with finer grain sizes less than 0.25 mm. said fused lime (a) and said bedding material (b) being present in a weight ratio of substantially 7:3, said bedding material being composed of substantially equimolar quantities of calcium oxide and zirconium oxide.

2. A composition as defined in claim 1 wherein said zirconium oxide has a grain size less than 0.12 mm.

3. A method of making a composition adapted to form a lining for metallurgical furnaces, comprising the steps of comminuting fused lime to a particulate mass with relatively coarse grain sizes ranging from substantially 0.25 mm. to 4 mm.; forming a bedding material from substantially equimolar quantities of comminuted calcium oxide and comminuted zirconium oxide with relatively fine grain sizes below 0.12 mm.; and mixing said particulate mass with said bedding material in a weight ratio of substantially 7:3.

4. A method of making a composition adapted to form a lining for metallurgical furnaces, comprising the steps of comminuting fused lime to a particulate mass with relatively coarse grain sizes ranging from substantially 0.25 mm. to 4 mm.; forming a bedding material from substantially equimolar quantities of comminuted calcium oxide and comminuted zirconium oxide with relatively fine grain sizes below 0.12 mm.; mixing said particulate mass with said bedding material in a weight ratio of substantially 7:3; and sintering the resulting mixture at temperatures above 1400° C.

5. A method as defined in claim 4 wherein the sintering temperature is substantially 1700° C.

6. A method as defined in claim 4 wherein the bedding material is formed by jointly fusing lime and zirconium oxide, followed by comminution of the fused material.

References Cited

UNITED STATES PATENTS

| | | | |
|---|---|---|---|
| 2,678,887 | 5/1954 | Hathaway | 106—58 |
| 2,971,240 | 2/1961 | Renkey | 106—63 |

JAMES E. POER, *Primary Examiner.*